United States Patent [19]

Hoblingre et al.

[11] Patent Number: 5,110,233
[45] Date of Patent: May 5, 1992

[54] DEVICE FOR TEMPORARILY AXIALLY IMMOBILIZING A SHAFT IN A BODY SUCH AS A STEERING COLUMN CASING TUBE

[75] Inventors: André Hoblingre, Valentigney; Patrick Courvoisier, Vieux Charmont; Gérard Bari, Valentigney, all of France

[73] Assignee: ECIA, France

[21] Appl. No.: 694,714

[22] Filed: May 2, 1991

[30] Foreign Application Priority Data

May 3, 1990 [FR] France .................... 9005589

[51] Int. Cl.5 ............................ B65D 59/00
[52] U.S. Cl. ..................... 403/12; 280/779; 74/492
[58] Field of Search ............... 74/492; 280/779, 780; 403/12

[56] References Cited

U.S. PATENT DOCUMENTS 4,406,176  9/1983  Numazawa et al. ............... 74/492

FOREIGN PATENT DOCUMENTS

| 0071220 | 2/1983 | European Pat. Off. . |
| 0152774 | 12/1988 | European Pat. Off. . |
| 2814818 | 10/1978 | Fed. Rep. of Germany . |
| 2611004 | 8/1988 | France . |
| 163961 | 12/1981 | Japan .................... 74/492 |
| 163962 | 12/1981 | Japan .................... 74/492 |

Primary Examiner—Andrew V. Kundrat
Attorney, Agent, or Firm—Sughrue, Mion, Zinn, Macpeak & Seas

[57] ABSTRACT

Inside a body or tube (1), a shaft (2) carries a collar (10) which is provided with a flange or circumferential rib (14) and is mounted on the shaft in a fixed manner. The flange is retained between two radial abutments (18, 19) carried by a locking element (16) fitted in an aperture in the tube. The radial abutments are suitably shaped and cooperate with a cam formed on the collar (10) for facilitating the ejection of the locking element (16) under the effect of a rotation of the shaft (2). This device is especially adapted to the immobilization of a steering shaft in a steering column tube before the mounting of the latter on a vehicle.

13 Claims, 3 Drawing Sheets

DEVICE FOR TEMPORARILY AXIALLY IMMOBILIZING A SHAFT IN A BODY SUCH AS A STEERING COLUMN CASING TUBE

BACKGROUND OF THE INVENTION

The present invention relates to a device for temporarily immobilizing in translation a shaft relative to a body or tube in which it is mounted, and more particularly a steering shaft in an automobile vehicle steering column casing tube.

A steering shaft is indeed rotatively mounted within the steering column casing tube by means of bearings allowing it to turn freely. Some bearings also ensure an axial immobilization of the steering shaft relative to the tube. But bearing in mind that these bearings are costly, there is an increasing tendency to replace them by cheaper needle or other bearings, which allow a relative displacement in translation. Generally, this axial freedom of movement of the shaft in the tube presents no inconvenience in the construction and utilization of the vehicle, because in most cases the axial immobilization function is no longer of interest when the steering column is mounted, since it is secured to the steering box which is itself immobilized. On the other hand, when storing or handling the shaft-steering column assembly before mounting, there is a danger of an axial separation of these two parts and consequently a deterioration of the assembly.

SUMMARY OF THE INVENTION

An object of the present invention is to overcome this situation by providing a device which permits maintaining the shaft and the tube in a given axial position until the mounting thereof, and consequently employing without risk bearings which allow a displacement in translation.

The invention therefore provides a device for temporarily axially immobilizing a shaft in a body, such as a vehicle steering column tube, which comprises a collar connected to the shaft and a locking element detachably secured in an aperture in the tube and forming inside the latter two radial abutment surfaces preventing the relative displacement of the collar in translation.

Preferably, the collar comprises at least one circumferential rib which overlaps the abutment surfaces of the locking element.

In another feature, the immobilizing device further comprises means for withdrawing the locking element carried by the collar and/or the locking element itself.

As any relative axial displacement of the shaft with respect to the tube is prevented by the cooperation of the collar with either one of the abutment surfaces, the assembly formed by the shaft and the tube may be moved about, stored and even mounted without danger of an untimely separation or a modification in the initially determined position. On the other hand, the shaft remains free to rotate inside the tube and the locking can be easily eliminated as soon as this is necessary.

The following description of embodiments which are given by way of non-limitative examples and shown in the accompanying drawings will bring out the features and advantages of the invention. In the drawings:

DESCRIPTION OF PREFERRED EMBODIMENTS

Figure 3:
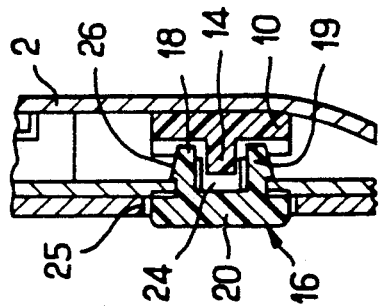
FIG. 3 is a sectional view to an enlarged scale taken on line 3—3 of FIG. 2.

The embodiments shown in the drawings concern the application of the temporary immobilizing device of the invention in the maintenance of a steering shaft inside an automobile vehicle steering column casing tube, but it will be clear that this is given merely by way of example and that the device may be employed for maintaining any solid or hollow shaft inside a body or a tube whenever it is necessary to prevent temporarily their relative axial displacement, for example during storage or transport.

Figure 2:
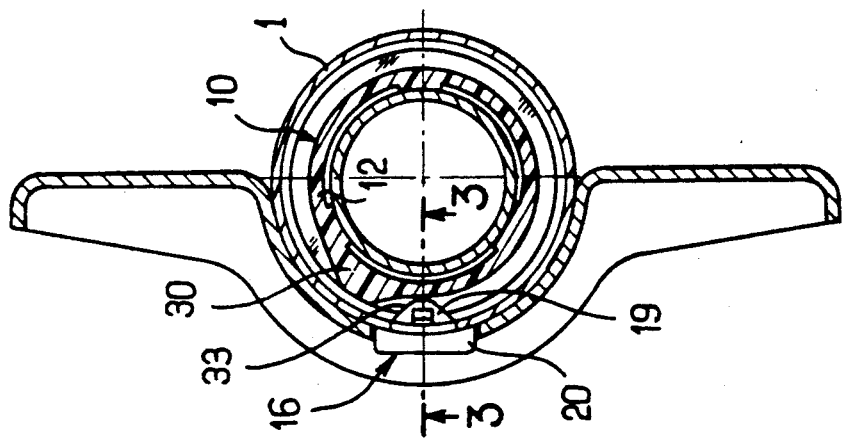
FIG. 2 is a sectional view taken on line 2—2 of FIG. 1.
Figure 1:
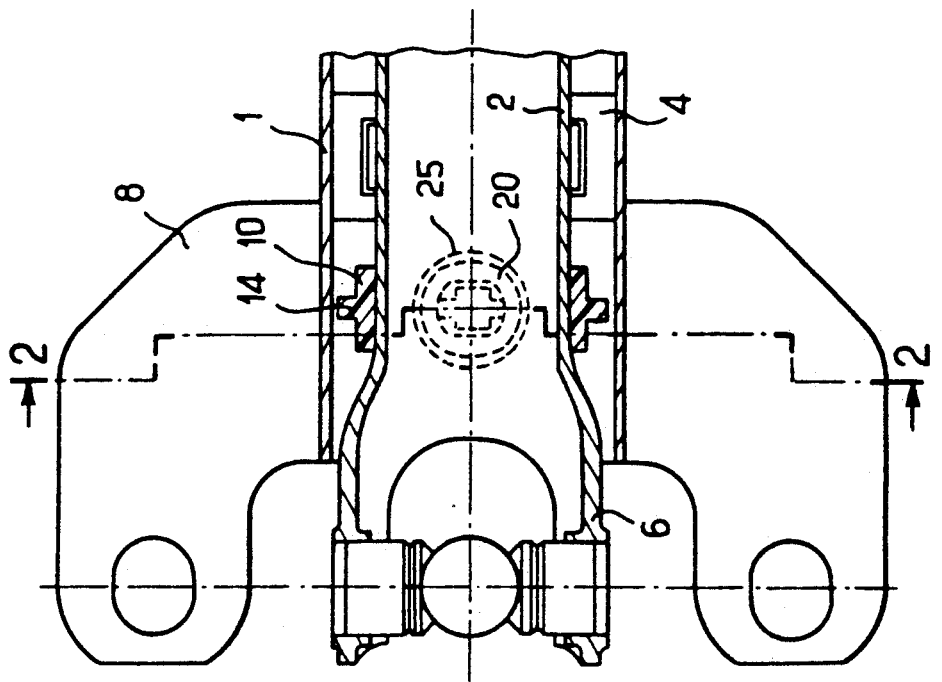
FIG. 1 is a partial longitudinal sectional view of a steering column provided with a device according to the invention.

The steering column shown in FIGS. 1 to 3 comprises a casing tube 1 in which is rotatively mounted a steering shaft 2 by means of bearings 4 of the needle or like type allowing a displacement in translation. Only the lower part of the shaft-casing tube assembly is shown. At this end the shaft 2 terminates in a universal joint yoke 6 and a bracket 8 is fixed to the tube 1 for connecting it to the body.

The shaft 2 carries between the bearing 4 and the universal joint yoke 6 a collar 10 having evenly spaced apart inner projections 12 which are crushed against the surface of the shaft 2 and thereby ensure a fully effective connection between the collar and shaft. The collar 10 further comprises in its median part a circumferential outer flange or rib 14 whose outside diameter is slightly less than the inside diameter of the tube 1.

The casing tube 1 carries in facing relation to the collar 10 a locking element 16 which constitutes two radial abutments limiting the axial displacement of the rib 14 and consequently the shaft 2.

Figure 4:
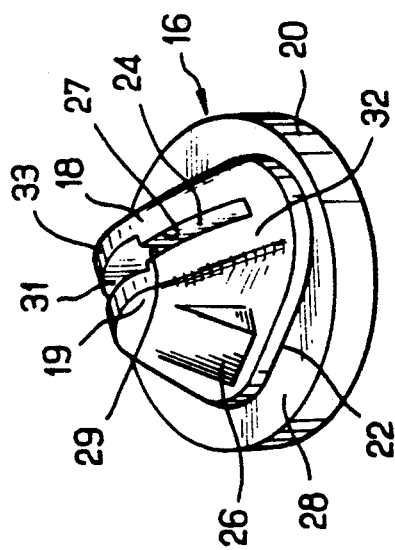
FIG. 4 is a perspective view of the locking element of the device according to the invention.

As shown more clearly in FIG. 4, the locking element 16 comprises a substantially cylindrical base 20 from which extends a spigot 22 having an oblong base and a smaller cross-sectional size. The spigot 22 is diametrically slotted at 24 so as to define two lips 18 and 19. The base 20 is disposed with clearance in an aperture 25 in the fixing bracket 8 while the spigot 22 is exactly fitted into an oblong aperture in the casing tube 1 (FIGS. 2 and 3). This spigot 22 is moreover immobilized in this aperture by the cooperation of pyramidal projections 26 formed on the outer surface of each of the lips 18 and 19 and bearing against the inner surface of the tube 1, with the base 20 which bears against the outer surface of this tube. For this purpose, the base 20 has adjacent to the spigot 22 a curved bearing surface 28 having a radius of curvature identical to that of the outer surface of the tube 1.

The locking element 16 is in this way firmly maintained in the tube 1 and forms inside the latter two fixed projections 18 and 19 spaced apart from each other by the width of the slot 24 which is slightly greater than the thickness of the rib 14. These projections or lips 18, 19 are placed astride the rib 14, their confronting surfaces 27, 29 being located on each side of the rib. These surfaces 27, 29 therefore constitute abutment surfaces preventing the displacement of the rib 14 in translation which is consequently retained without a gripping action inside the slot 24 but is unable to move axially.

In the embodiment shown in FIGS. 1 to 3, the collar 10 further comprises a local projection 30 which forms on each side of the circumferential rib 14 a cam for ejecting the locking element 16. The radial lips 18 and 19 are preferably also suitably shaped and have oblique lateral surfaces which impart to their radial cross-section the general shape of a reclining V with a rounded apex 33 (FIGS. 2 and 4).

Thus, when the axial immobilization is no longer necessary, for example because the assembly formed by the tube 1 and the shaft 2 is mounted on the vehicle and is ready for use, a simple rotation of the shaft 2 inside the tube 1 brings the cam 30 into contact with the rounded apex 33. By continuing the rotation of the shaft, this cam thrusts this apex 33 back and causes the locking element 16 to leave the apertures of the tube 1 and bracket 8. The shaft 2 is no longer axially immobilized owing to the fact that it is mounted on the vehicle and may be adjusted with respect to the tube 1 if necessary.

The immobilizing device according to the invention therefore permits both maintaining constant the initial relative positions of the shaft 2 and tube 1, and carrying out the mounting and the subsequent adjustments in the usual manner by taking advantage of the possibilities of axial displacement allowed by the shaft-supporting bearings.

Such a device is cheap and easy to place in position, since it is merely necessary to slip the collar 10 onto the shaft 2 to the vicinity of the universal joint yoke 6 before introducing this shaft into the tube 1 and the bearing 4, then pass the locking element 16 through the aperture 25 of the bracket 8 into the aperture of the tube 1 to fit the lips 18 and 19 onto the rib 14. No particular precaution is necessary.

However, the locking element is preferably made from a plastics material and the slot 24 is enlarged in its central part 31 which, in increasing the flexibility of the lips 18, 19 in the region of the projections 26, facilitates placing the locking element in position and improves the fixing safety.

Figure 5:
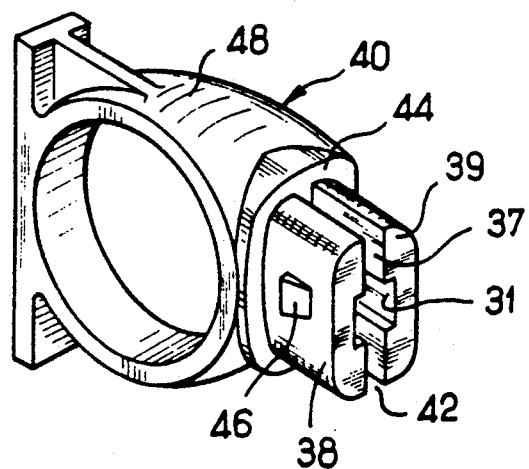
FIG. 5 is a perspective view of a variant of the construction of the locking element.
Figure 6:
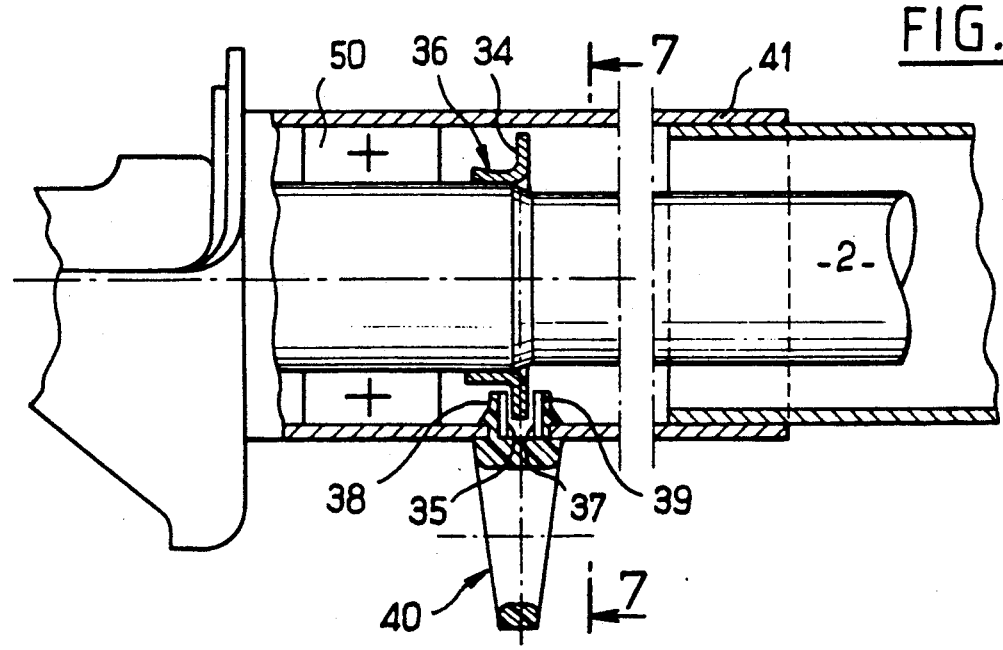
FIG. 6 is a partial longitudinal sectional view of a steering column employing the locking element shown in FIG. 5.
Figure 7:
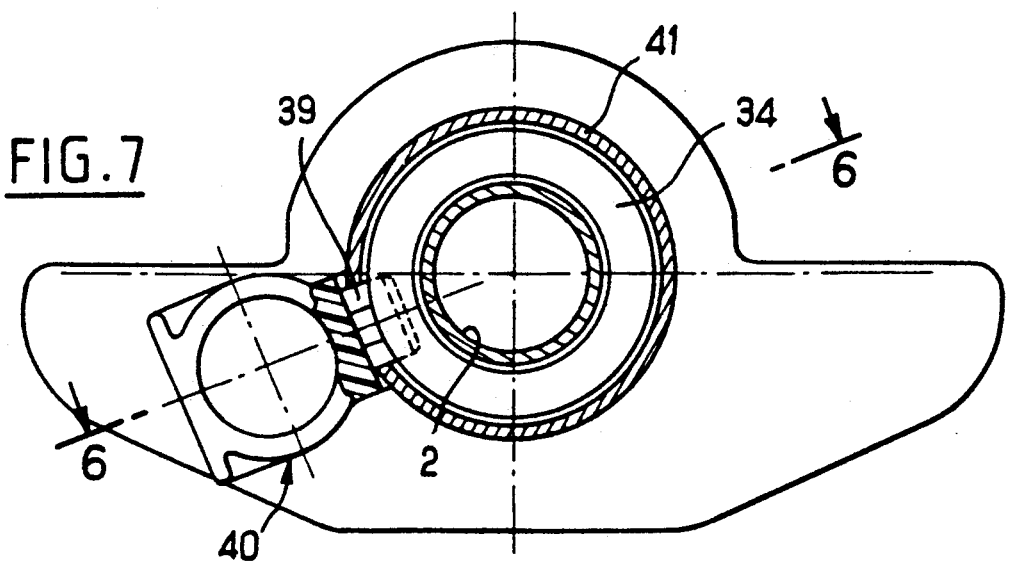
FIG. 7 is a sectional view, with a part cut away, taken on line 7—7 of FIG. 6.

In a variant shown in FIGS. 5 to 7, the shaft 2 carries a flange 34 which is formed by the radial wing of an L-section collar 36 fixed to the shaft 2. The collar 36 is preferably composed of metal. As before, the flange 34 is retained between the confronting radial surfaces 37 and 35 respectively of the two lips 38 and 39 of a locking element 40 mounted in an aperture of a casing tube 41.

The lips 38 and 39 are separated by a slot 42 whose width is slightly greater than the width of the flange 34. They extend from a curved bearing surface 44 bearing against the outer surface of the tube 41 and carry outer projections 46 which bear against the inner surface of the tube 41 and immobilize the locking element 40 with respect to the latter. In the illustrated embodiment, the bore of the tube 41 has an oblong shape and the two radial lips 38 and 39 have substantially flat shapes.

In the same way as the locking element 16, the element 40 is firmly maintained on the tube 1 and prevents, by means of the abutment surfaces 35 and 37, any axial displacement of the collar fixed to the shaft 2, i.e. any translation of the latter with respect to the tube.

Preferably, as shown more particularly in FIG. 5, the curved bearing surface 44 is defined by a lateral extension of a holding ring 48 which constitutes the body of the locking element 40. Thus, the locking element 40 may be easily withdrawn from the tube 41 merely by exerting a pull on the handling ring 48 as soon as the immobilization is no longer required. The shaft 2 is then free not only to turn in the tube 1 but also to move axially in the bearings 50 carrying it.

Such an embodiment is more particularly adapted to be mounted in a tube 41 whose end is open and whose length is limited, for example in a retractable steering column casing tube. In this case, the collar 36 is preferably inserted into the tube 41 from its open end remote from the bearing 50. It is maintained by means of for example a tool during the introduction of the shaft 2 until the latter is fully placed in position and the full interconnection of these two elements is achieved. The locking element 40 may then be passed through the wall of the tube 41 so as to axially immobilize the flange 34.

Figure 8:
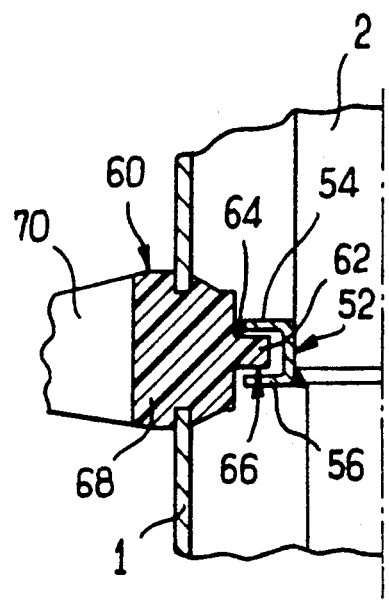
FIG. 8 is a view similar to FIG. 3 of a variant.
Figure 9:
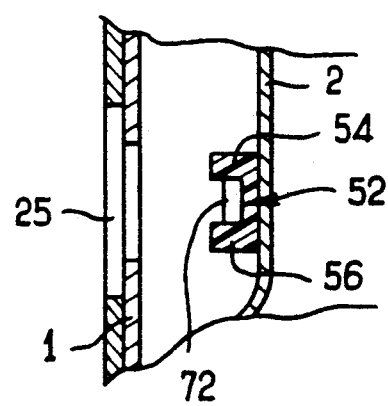
FIG. 9 is a view similar to FIG. 8 of another variant before the locking element is placed in position.

In a further variant the collar 52 fixed to the shaft 2 comprises two circumferential ribs 54 and 56 respectively, and has, for example as shown in FIGS. 8 and 9, an axial section in the shape of a reclining U. This collar cooperates with a locking element 60 having a central lip 62 which freely extends between ribs 54 and 56. The opposite surfaces 64 and 66 of this lip thus constitute radial abutment surfaces each of which cooperates with a respective one of the ribs 54 or 56 so as to prevent any relative displacement of the shaft 2 and tube 1 in translation.

As the distance between the ribs 54, 56 is slightly greater than the thickness of the lip 62, the latter is fitted without a gripping action between these ribs but nonetheless prevents the relative axial displacement.

The lip 62 is formed at the end of a body 68 which includes, in the same way as the elements 16 and 40, a curved bearing surface which bears against the outer surface of the tube 1 and lateral projections for hooking onto the inner surface of this tube. The body 68 may moreover be fixed to a handling ring 70 (partly shown in FIG. 8) so as to permit the manual extraction of this body.

The extracting means may also be formed, as shown in FIG. 9, by an ejecting cam 72 formed on the collar 52 between the two ribs 54 and 56. The lip 62 then preferably has a suitable shape similar to that of the lips of the element 16. Consequently., a rotation of the shaft 2 is sufficient to cause the extraction of the locking element 60 under the effect of the force exerted by the cam 72 on the lip 62.

In all cases there is therefore provided a device for temporarily immobilizing the two elements of the shaft-tube assembly while this is required, while conserving the possibility of again allowing their axial displacement at any moment.

It will be understood that various other modifications may be made in the embodiments just described without departing from the scope of the invention. For example, the locking element 16 may be provided with handling means and cooperate with a collar which has no ejecting cam 30.

What is claimed is:

1. Device for temporarily axially immobilizing an inner shaft in an outer body containing an aperture in a wall thereof, said device comprising: a collar fixed to said shaft; and a locking element detachably fixed in said aperture and to the wall of said body; said collar and said locking element together defining, inside said body, a radial flange sandwiched between two radial abutment surfaces which prevent relative axial displacement between said shaft and said body, said flange and said abutment surfaces being mounted on respectively different ones of said shaft and said body.

2. Device according to claim 1, further comprising means for withdrawing said locking element from said aperture, said means being carried by said collar.

3. Device according to claim 1, further comprising means for withdrawing said locking element from said aperture, said means being carried by said locking element.

4. Device according to claim 1, further comprising means for withdrawing said locking element from said aperture, said means being carried by said locking element and said collar.

5. Device according to claim 1, wherein said locking element comprises retaining projections on outer surfaces of said locking element and a bearing surface for bearing against an outer surface of said body.

6. Device according to claim 1, wherein said locking element is externally extended by holding means.

7. Device according to claim 1, wherein said collar defines a cam for ejecting said locking element from said aperture.

8. Device according to claim 1, wherein said flange is a circumferential flange on said collar, and said abutment surfaces are two radial lips on said locking element which freely engage each side of said flange.

9. Device according to claim 8, wherein said flange is a central circumferential rib of said collar.

10. Device according to claim 8, wherein said flange is a radial end rib of an L-section collar.

11. Device according to claim 1, wherein said locking element comprises two lips which are separated by a slot which is enlarged in a central part of said slot.

12. Device according to claim 1, wherein said abutment surfaces are two circumferential ribs on said collar, and said flange is on said locking element and is received between said circumferential ribs.

13. Device according to claim 1, wherein said locking element has, inside said body, a radial section in the shape of a reclining V having a rounded apex.

* * * * *